United States Patent
Strom et al.

(10) Patent No.: US 7,441,538 B2
(45) Date of Patent: *Oct. 28, 2008

(54) METHOD FOR AUTO-IGNITION OPERATION AND COMPUTER STORAGE DEVICE FOR USE WITH AN INTERNAL COMBUSTION ENGINE

(75) Inventors: Hans Strom, Kode (SE); Lucien Koopmans, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/846,410

(22) Filed: Aug. 28, 2007

(65) Prior Publication Data

US 2008/0000446 A1    Jan. 3, 2008

Related U.S. Application Data

(60) Continuation of application No. 11/610,445, filed on Dec. 13, 2006, now Pat. No. 7,400,966, which is a division of application No. 11/131,756, filed on May 17, 2005, now Pat. No. 7,156,070, which is a division of application No. 10/747,023, filed on Dec. 23, 2003, now Pat. No. 6,910,449.

(30) Foreign Application Priority Data

Dec. 30, 2002   (EP) ................................. 02029060
Dec. 30, 2002   (EP) ................................. 02029091

(51) Int. Cl.
*F02B 5/00* (2006.01)
*F01L 1/34* (2006.01)

(52) U.S. Cl. ..................... 123/305; 123/90.15; 123/345

(58) Field of Classification Search .............. 123/90.15, 123/90.16, 90.1, 321, 322, 345, 346, 347, 123/348, 305
See application file for complete search history.

(56) References Cited

U.S. PATENT DOCUMENTS 352,861 A    11/1886   Dowden (Continued)

FOREIGN PATENT DOCUMENTS

DE    19850584    5/2000

(Continued)

*Primary Examiner*—John T Kwon
(74) *Attorney, Agent, or Firm*—Allan J. Lippa; Alleman Hall McCoy Russell & Tuttle, LLP

(57) ABSTRACT

An internal combustion engine that can be operated in compression ignition mode, comprising a fuel injector (2) for each cylinder; a fuel injection control unit (4) for controlling fuel injection quantity and a piston (5) in each cylinder whose compression action causes a mixture of air and fuel to be ignited. The engine is further provided with inlet and outlet valves (6, 7) and sensors (12-16) for measuring various engine operating parameters, is disclosed. During compression ignition mode, the control unit controls the fuel injector to perform a first fuel injection before, and a second fuel injection after top dead center of the piston stroke during or after a negative valve overlap period. A method for operating the engine and a computer readable storage device (4) having stored therein data representing instructions executable by a computer to implement a compression ignition for an internal combustion engine is also described.

6 Claims, 4 Drawing Sheets

U.S. PATENT DOCUMENTS

| | | |
|---|---|---|
| 6,237,562 B1 * | 5/2001 | Awasaka et al. ............ 123/305 |
| 6,267,097 B1 | 7/2001 | Urushihara et al. |
| 6,354,264 B1 | 3/2002 | Iwakiri et al. |
| 6,425,367 B1 | 7/2002 | Hiraya et al. |
| 7,156,070 B2 | 1/2007 | Strom et al. |
| 2001/0035152 A1 | 11/2001 | Knoll |
| 2002/0011233 A1 | 1/2002 | Shiraishi et al. |
| 2003/0015156 A1 | 1/2003 | Leone et al. |

FOREIGN PATENT DOCUMENTS

| | | |
|---|---|---|
| EP | 000352861 | 2/1993 |
| EP | 001063427 | 12/2000 |
| EP | 001085191 | 3/2001 |
| EP | 001085192 | 3/2001 |
| EP | 001134398 | 9/2001 |
| EP | 001134400 | 9/2001 |
| EP | 001136678 | 9/2001 |
| EP | 001156199 | 11/2001 |
| EP | 001167734 | 1/2002 |
| EP | 001201903 | 5/2002 |
| JP | 2000274246 | 10/2000 |
| JP | 2001059421 | 3/2001 |
| WO | WO 0028197 | 5/2000 |
| WO | WO 0028198 | 5/2000 |

* cited by examiner

METHOD FOR AUTO-IGNITION OPERATION AND COMPUTER STORAGE DEVICE FOR USE WITH AN INTERNAL COMBUSTION ENGINE

The present application is a continuation of U.S. patent application Ser. No. 11/610,445 filed on Dec. 13, 2006, which is a divisional of U.S. patent application Ser. No. 11/131,756, filed on May 17, 2005, now U.S. Pat. No. 7,156,070 issued Jan. 2, 2007, which is a divisional of U.S. patent application Ser. No. 10/747,023, filed on Dec. 23, 2003, now U.S. Pat. No. 6,910,449 issued Jun. 28, 2005, which claims priority to European Patent Application No. 02029060.7, filed Dec. 30, 2002, titled INTERNAL COMBUSTION ENGINE, METHOD FOR AUTO-IGNITION OPERATION AND COMPUTER READABLE STORAGE DEVICE, naming Hans Ström and Lucien Koopmans as inventors, and claims priority to European Patent Application No. 02029091.2, filed Dec. 30, 2002 titled, INTERNAL COMBUSTION ENGINE, METHOD FOR AUTO-IGNITION OPERATION AND COMPUTER READABLE STORAGE DEVICE, naming Hans Ström and Lucien Koopmans as inventors, the entire contents of which are incorporated herein by reference.

BACKGROUND AND TECHNICAL FIELD

The invention relates to an internal combustion engine that can be operated in a homogeneous charge compression ignition combustion mode, as well as a method for controlling such an engine.

SUMMARY

To improve thermal efficiency of gasoline internal combustion engines, lean burn is known to give enhanced thermal efficiency by reducing pumping losses and increasing ratio of specific heats. Generally speaking, lean burn is known to give low fuel consumption and low NOx emissions. There is, however, a limit at which an engine can be operated with a lean air/fuel mixture because of misfire and combustion instability as a result of a slow burn. Known methods to extend the lean limit include improving ignitability of the mixture by enhancing the fuel preparation, for example using atomised fuel or vaporised fuel, and increasing the flame speed by introducing charge motion and turbulence in the air/fuel mixture. Finally, combustion by auto-ignition, or homogeneous charge compression ignition, has been proposed for operating an engine with very lean or diluted air/fuel mixtures.

When certain conditions are met within a homogeneous charge of lean air/fuel mixture during low load operation, homogeneous charge compression ignition can occur wherein bulk combustion takes place initiated simultaneously from many ignition sites within the charge, resulting in very stable power output, very clean combustion and high fuel conversion efficiency. NOx emission produced in controlled homogeneous charge compression ignition combustion is extremely low in comparison with spark ignition combustion based on propagating flame front and heterogeneous charge compression ignition combustion based on an attached diffusion flame. In the latter two cases represented by spark ignition engine and diesel engine, respectively, the burnt gas temperature is highly heterogeneous within the charge with very high local temperature values creating high NOx emission. By contrast, in controlled homogeneous charge compression ignition combustion where the combustion is uniformly distributed throughout the charge from many ignition sites, the burnt gas temperature is substantially homogeneous with much lower local temperature values resulting in very low NOx emission.

Engines operating under controlled homogeneous charge compression ignition combustion have already been successfully demonstrated in two-stroke gasoline engines using a conventional compression ratio. It is believed that the high proportion of burnt gases remaining from the previous cycle, i.e., the residual content, within the two-stroke engine combustion chamber is responsible for providing the hot charge temperature and active fuel radicals necessary to promote homogeneous charge compression ignition in a very lean air/fuel mixture. In four-stroke engines, because the residual content is low, homogeneous charge compression ignition is more difficult to achieve, but can be induced by heating the intake air to a high temperature or by significantly increasing the compression ratio. This effect can also be achieved by retaining a part of the hot exhaust gas, or residuals, by controlling the timing of the intake and exhaust valves.

In all the above cases, the range of engine speeds and loads in which controlled homogeneous charge compression ignition combustion can be achieved is relatively narrow. The fuel used also has a significant effect on the operating range; for example, diesel and methanol fuels have wider auto-ignition ranges than gasoline fuel. A further problem is to achieve ignition at a particular time with maintained combustion stability, while avoiding engine knocking and misfiring.

Hence an may be desirable, in some cases, to provide a means for controlling the ignition timing during auto-ignition, which means allows for monitoring of current combustions and for correction of subsequent combustions dependent on the outcome of the monitoring process.

The above problems can be solved, in some cases, by an arrangement, a method and a computer readable storage device for controlling homogeneous charge compression ignition combustion, as described in more detail below.

One example embodiment relates to an internal combustion engine preferably, but not necessarily, provided with variable valve timing (VVT), cam profile switching (CPS), direct fuel injection (DI), and means for boosting the manifold absolute pressure (turbocharger, compressor etc.). The following text will be mainly concentrated on embodiments including the above features. However, the general principle of the invention as claimed is also applicable to, for instance, stationary aspirating engines with fixed valve timing and a standard camshaft. Such engines are often operated at fixed speeds and loads and are not subject to the transients normally occurring in, for instance, engines for vehicles. Hence a stationary engine can be operated continuously in HCCI-mode.

Also, although the following examples relate to gasoline fuels, an engine operating according to principles of the invention can be adapted to use most commonly available fuels, such as diesel, kerosene, natural gas, and others.

The engine is possible to be operated on homogeneous charge compression ignition (HCCI) combustion mode. This is a combustion mode, different than conventional spark ignited (SI) combustion mode, in order to reduce fuel consumption in combination with ultra low NOx emissions. In this mode, a mixture containing fuel, air and combustion residuals is compressed with a compression ratio between 10.5 and 12 to auto ignition. The HCCI combustion has no moving flame front, in contradiction to a SI combustion that has a moving flame front. The lack of a flame front reduces temperature and increases the heat release rate hence increases the thermal efficiency of the combustion. The combustion residuals are captured when operating the engine with a negative valve overlap. Residuals increase the temperature of the mixture so that the auto ignition temperature is reached before piston top dead center (TDC) and dilute the mixture so that the heat release rate decreases to an acceptable level. By controlling the heat release, cycle-to-cycle variations (COV), noise and knocking combustion can be reduced. The negative valve overlap is achieved when the exhaust valve is closed before piston TDC and the inlet valve is opened after piston TDC in the gas exchange phase of the combustion.

The acquired valve timing for the negative overlap can be achieved by using VVT and CPS, hence switching from conventional SI valve timing to HCCI valve timing with a shorter the valve opening duration and/or valve lift.

One embodiment of the invention uses a gasoline internal combustion engine provided with at least one cylinder and arranged to be switched between spark ignition mode and compression ignition mode. The engine comprises a fuel injector, through which gasoline fuel is injected into a combustion chamber, for each cylinder and a fuel injection control unit that controls gasoline fuel injection quantity per combustion cycle injected through each fuel injector. Fuel injection is achieved by means of direct injection (DI) into each combustion chamber.

A spark may be sustained in HCCI mode in order to keep the spark plug from fouling and, although the gas mixture is arranged to self ignite, contribute to an increased combustion stability and avoidance of misfire.

A reciprocating piston is arranged in each engine cylinder whose compression action causes a mixture of air and gasoline fuel within the combustion chamber to be ignited. Gas exchange is controlled by at least one inlet valve preferably, but not necessarily, provided with variable valve timing per cylinder for admitting a combustible gas, such as air, and at least one exhaust valve preferably, but not necessarily, provided with variable valve timing per cylinder for exhausting combusted gases.

The combustion process is monitored by sensors for measuring engine knocking and combustion stability. The knock sensor can be of the piezo-electric type, which may also be used for continuous monitoring of cylinder pressure. The combustion stability sensor may be an acceleration type sensor, such as a flywheel sensor, or an ion current sensor. Alternatively, both said sensors can be replaced by a single in-cylinder piezoelectric pressure sensor. By processing the output from such a sensor, it is possible to obtain a signal representing engine knock and a signal representing engine stability.

According to one embodiment, the engine is arranged to switch between SI-mode to HCCI-mode when certain operating parameters are fulfilled. During compression ignition mode, the exhaust valve is arranged to close before top dead center during an exhaust stroke of the piston and the intake valve is opened after top dead center during an induction stroke of the piston. This creates a period of negative valve overlap, during which exhaust and intake valves are closed. The fuel injection control unit is arranged to control the fuel injection quantity so as to perform a first fuel injection before top dead center of the piston exhaust stroke and to perform at least a further fuel injection after top dead center of the piston stroke during or after the interval of the gas exchange phase when both of the exhaust and intake valves are closed.

In the following text the first injection will generally be referred to as a pilot injection, while any subsequent injection or injections will be referred to as a main injection. The pilot or first fuel injection occurs in the interval between closure of the exhaust valve and top dead center of the piston exhaust stroke. At least one further fuel injection occurs in the interval after top dead center of the piston exhaust stroke and before top dead center of a subsequent piston compression stroke.

Injection near the top dead center is generally avoided to avoid formation of soot in the combustion chamber. Said further, or main injection may be a single second injection or comprise two or more injections. The total amount of the main injection can exceed the amount injected in the pilot injection (although in some cases it always does so).

According to a further embodiment of the invention, the amount of fuel injected during first injection and one or more second, main injections is determined by the fuel injection control unit on the basis of comparison between predetermined limit values for a knock signal transmitted from said engine knocking sensor and a stability signal transmitted from said combustion stability sensor respectively.

According to a further embodiment of the invention, the total amount of fuel injected during the first and second injections is substantially constant under constant engine operating conditions.

According to a further embodiment of the invention the distribution of injected fuel between the first and the second injection is adjusted in increments based on the comparison made by the injection control unit. The adjustments are determined by the following conditions;

if the knock signal and the stability signal are below their predetermined limit values, the fuel injection control unit is arranged to reduce the amount injected during the first injection;

if the knock signal and the stability signal are above their predetermined limit values, the fuel injection control unit is arranged to increase the amount injected during the first injection;

if the knock signal is above its predetermined limit value and the stability signal is below its predetermined limit value, the fuel injection control unit is arranged to reduce the amount injected during the first injection; or if the knock signal is below a predetermined limit value and the stability signal is above a predetermined limit value, the fuel injection control unit is arranged to increase the amount injected during the first injection.

In the latter case, where it is detected that the knock signal is below a predetermined limit value and the stability signal is above a predetermined limit value, two further conditions are applied;

if it is detected that a combustion peak pressure occurs earlier than a predetermined point in time, the fuel injection control unit is arranged to increase the amount of fuel injected during the first injection for the subsequent combustion cycle; or if it is detected that a combustion peak pressure occurs later than a predetermined point in time, the fuel injection control unit is arranged to increase the amount of fuel injected during the first injection for the cycle following the subsequent combustion cycle.

Although the relative amount of fuel injected is adjustable, the first injection is arranged as a pilot injection, while the second injection is a main injection. Hence, the quantity of the first injection is preferably selected to be greater than zero but less than 45% of the total amount of injected fuel, comprising the pilot and the main injection. The fuel of the pilot injection will react in the residual exhaust gas, forming radicals, intermediates or combustion products. This reaction can be exothermic hence heating the residuals, resulting in earlier timing of the auto ignition temperature. As will be described later, this reaction takes place in the presence of excess oxygen, which may be present in the combustion chamber following the previous combustion cycle. The retained residual exhaust gas will have the same $\lambda$-value as the air/fuel mixture of the previous combustion cycle.

According to a further embodiment, the invention also relates to a method for operating a internal combustion engine provided with at least one cylinder and arranged to be switched between spark ignition mode and compression ignition mode, or to be operated continuously in compression ignition mode. As described above, the engine comprises a fuel injector, through which gasoline fuel is injected into a combustion chamber, for each cylinder, a fuel injection control unit that controls gasoline fuel injection quantity per combustion cycle injected through each fuel injector, and a piston in the engine cylinder whose compression action causes a mixture of air and gasoline fuel within the combustion chamber to be ignited during compression ignition mode. The gas exchange is controlled by at least one inlet valve preferably, but not necessarily, provided with variable valve timing per cylinder for admitting combustible gas and at least one exhaust valve with variable valve timing per cylinder for exhausting combusted gases. The combustion process may be monitored by a sensor for measuring engine knocking and generating a knock signal and a sensor for measuring combustion stability and generating a stability signal.

The method for controlling the engine involves adjusting opening and closing timings of the inlet valve and the exhaust valve so that the piston moving within the cylinder performs an intake phase, a compression phase, an expansion phase, an exhaust phase and an exhaust retaining phase, while performing a split fuel injection during and after the exhaust retaining phase.

According to a further embodiment of the invention, the method includes the following steps during the exhaust retaining phase:
  closing the exhaust valve before top dead center during an exhaust stroke of the piston and opening the intake valve after top dead center during an induction stroke of the piston; and
  controlling the fuel injection control unit so as to perform a first fuel injection before top dead center of the piston stroke and to perform a second gasoline fuel injection in the interval after top dead center of the piston exhaust stroke and before top dead center of a subsequent piston compression stroke.

According to a further embodiment of the invention, the method also involves comparing each of the knock signal and the stability signal with a respective predetermined limit value. Depending on the outcome of said comparison, the quantities of the first and second fuel injections are adjusted by;
  reducing the amount injected during the first injection if both signals are below their predetermined limit values;
  increasing the amount injected during the first injection if both signals are above their predetermined limit values;
  reducing the amount injected during the first injection if the knock signal is above its predetermined limit value and the stability signal is below its predetermined limit value; or
  increasing the amount injected during the first injection if the knock signal is below a predetermined limit value and the stability signal is above a predetermined limit value.

For the latter case, where the knock signal is below a predetermined limit value and the stability signal is above a predetermined limit value, a further condition is applied. A combustion peak pressure timing is detected to allow a comparison of the actual timing of the peak pressure with a predicted timing of peak pressure. The peak pressure timing may be detected by a suitable existing sensor or by a separate pressure sensor. The quantities of the first and second fuel injections are adjusted by;
  increasing the amount of fuel injected during the first injection for the subsequent combustion cycle if the actual timing occurs earlier than said predicted timing; or
  increasing the amount of fuel injected during the first injection for the cycle following the subsequent combustion cycle if the actual timing occurs later than said predicted timing.

According to a further embodiment, the invention also relates to a computer readable storage device having stored therein data representing instructions executable by a computer to implement a compression ignition for a gasoline internal combustion engine, the engine having a piston disposed in a cylinder to define a combustion chamber, intake valves for admitting fresh air into the cylinder, a fuel injector for injecting fuel into the combustion chamber, and exhaust valves for discharging exhaust gas resulting from combustion within the cylinder, wherein opening and closing timings of the intake means and opening and closing timings of the exhaust valves are adjustable. The computer readable storage device comprises:
  instructions for adjusting opening and closing timings of the intake means and opening and closing timings of the exhaust means such that the piston reciprocates within the cylinder to perform an exhaust phase, an exhaust gas retaining phase, an intake phase, a compression phase, and an expansion phase;
  instructions for providing a first start time of a first fuel injection by the fuel injector during said exhaust gas retaining phase and a further start time of a second fuel injection by the fuel injector in the interval after top dead center of the piston exhaust stroke and before top dead center of a subsequent piston compression stroke;
  instructions for determining a portion of total fuel quantity and the remainder of said total fuel quantity;
  instructions for determining a first fuel injection control signal indicative of said portion of said total fuel quantity and applying said first fuel injection control signal to the fuel injector at said first start time to control fuel quantity injected for said first fuel injection; and
  instructions for determining a further fuel injection control signal indicative of the remainder of said total fuel quantity and applying said further fuel injection control signal to the fuel injector at said further start time to control fuel quantity injected for said second fuel injection.

According to a further embodiment the invention, the computer readable storage device also comprises instructions for determining the fuel injection control signals indicative of the amount of fuel injected during the first and second injection, as determined by the fuel injection control unit on the basis of comparison between predetermined limit values for a knock signal transmitted from an engine knocking sensor and stability signals transmitted from a combustion stability sensor respectively. The control unit estimates the cycle-to cycle variations (COV) by storing and evaluating a number of subsequent stability signals.

The computer readable storage device comprises:
  instructions for adjusting opening and closing timings of the intake valves and opening and closing timings of the exhaust valves such that the piston reciprocates within the cylinder to perform an exhaust phase, an exhaust gas retaining phase, an intake phase, a compression phase, and an expansion phase;
  instructions for providing a first start time of a first fuel injection by the fuel injector during said exhaust gas retaining phase and a further start time of at least one further fuel injection by the fuel injector in the interval after top dead center of the piston stroke and before top dead center of a subsequent piston compression stroke;

instructions for determining a portion of total fuel quantity and the remainder of said total fuel quantity;

instructions for determining a first fuel injection control signal indicative of said portion of said total fuel quantity and applying said first fuel injection control signal to the fuel injector at said first start time to control fuel quantity injected for said first fuel injection; and instructions for determining a further fuel injection control signal indicative of the remainder of said total fuel quantity and applying said further fuel injection control signal to the fuel injector at said further start time to control fuel quantity injected for said further fuel injection.

In a further embodiment, the computer readable storage device comprises:

instructions for determining the fuel injection control signals indicative of the amount of fuel injected during the first injection and a second injection, as determined by the fuel injection control unit on the basis of comparison between predetermined limit values for a knock signal transmitted from an engine knocking sensor and a stability signal transmitted from a combustion stability sensor respectively.

BRIEF DESCRIPTION OF DRAWINGS

In the following text, the invention will be described in detail with reference to the attached drawings. These drawings are used for illustration only and do not in any way limit the scope of the invention. In the drawings.

DETAILED DESCRIPTION

Figure 1:
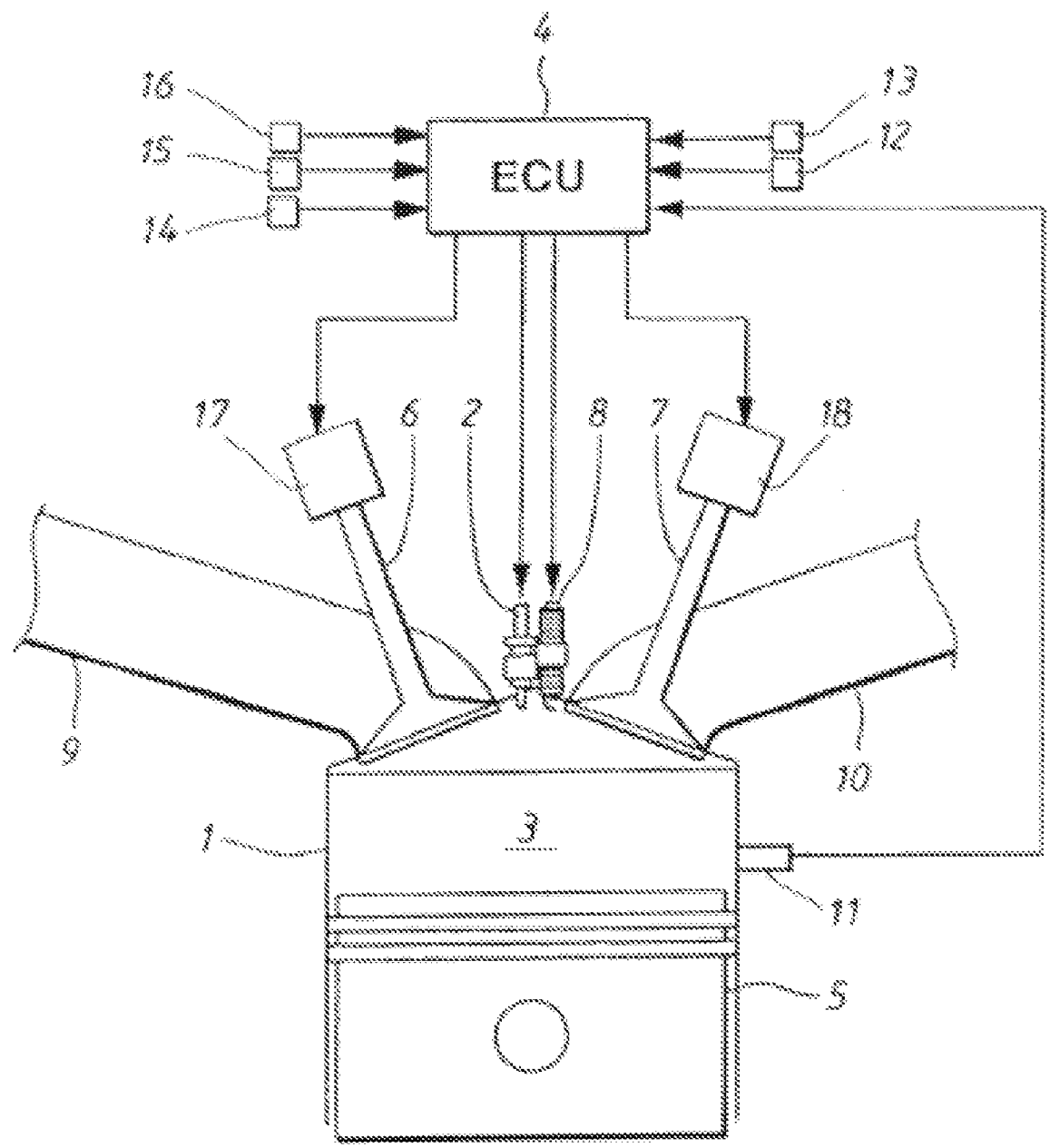
FIG. 1 shows a schematic internal combustion engine according to the invention.

FIG. 1 shows a schematic illustration of an internal combustion engine according to the invention. The engine is provided with at least one cylinder 1 and comprises a fuel injector 2, through which fuel is injected into a combustion chamber 3, for each cylinder. A fuel injection control unit 4 controls fuel injection quantity per combustion cycle injected through each fuel injector. A piston 5 in the engine cylinder has a compression action that causes a mixture of air and fuel within the combustion chamber to be ignited during HCCI-mode. The cylinder is provided with at least one inlet valve 6 for admitting gas which includes fresh air into said cylinder and at least one exhaust valve 7 for exhausting combusted gases from said cylinder. Air is supplied through an intake conduit 9 connected to an intake manifold, while exhaust gas is exhausted through an exhaust conduit 10. During SI-mode, the ignition of the fuel/air mixture is ignited by a spark plug 8.

The control unit receives signals from at least one sensor for measuring engine operation parameters, which sensors include a combustion chamber pressure sensor 11, an intake manifold pressure sensor 12 and a λ-probe 13 in the exhaust conduit, as well as temperature sensors for intake air 14, engine coolant 15 and engine oil 16. The control unit controls the intake and exhaust valves 6, 7 by means of valve actuators 17, 18. The actuators may be either electrically or mechanically operated.

Figure 2:
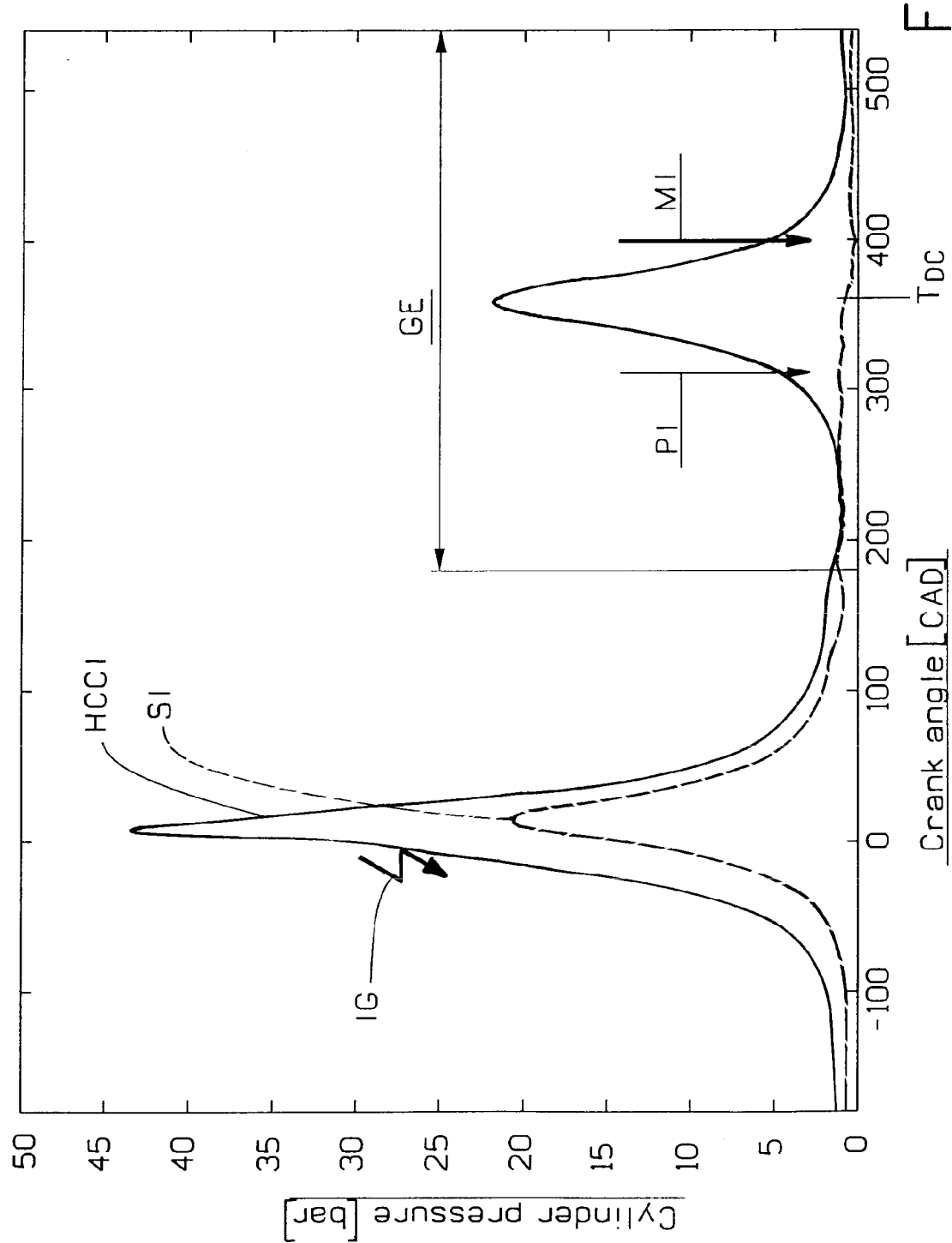
FIG. 2 shows a diagram illustrating the variation of cylinder pressure over crank angle for HCCI- and SI-mode.

FIG. 2 shows a diagram illustrating the variation of cylinder pressure over crank angle for HCCI- and SI-mode. As can be seen from the curves in the diagram, the engine can be operated in homogeneous charge compression ignition (HCCI) combustion mode and in conventional spark ignited (SI) combustion mode. The HCCI combustion has no moving flame front, as opposed to a SI combustion that has a moving flame front. The lack of a flame front reduces temperature and increases the heat release rate hence increases the thermal efficiency of the combustion. This will result in a considerably higher peak pressure after ignition (IG); typically in excess of 40 bar, as opposed to about 20 bar in SI mode. The main difference between the HCCI- and SI modes is that a part of the combustion residuals are captured by operating the engine with a negative valve overlap. The negative valve overlap is achieved by closing the exhaust valve, or EV, before piston TDC (EVC) and opening the inlet valve, or IV, after piston TDC (IVO) in the gas exchange (GE) phase of the combustion, as illustrated in FIG. 2. During the air intake phase, residuals increase the temperature of the mixture so that the auto ignition temperature is reached before piston top dead center (TDC) and dilutes the mixture so that the heat release rate decreases to an acceptable level. By controlling the heat release, noise and knocking combustion can be reduced.

A split fuel injection is used having a pilot direct fuel injection (PI) before TDC during the negative valve overlap and a main direct fuel injection (MI) after TDC of the negative valve overlap. The relative quantities of fuel injected during the pilot and the main injections can be varied and are calculated and controlled by a fuel injection control unit (not shown). The fuel of the pilot injection (PI) will react in the retained residuals, forming radicals, intermediates or combustion products. This reaction can be exothermic hence heating the residuals, resulting in earlier timing of the auto ignition temperature. A prerequisite for this reaction is the presence of excess oxygen, without which the reaction will stop before it is completed. When the engine is operated in HCCI-mode the control unit must adjust the value of λ to be sufficiently high for all engine operating conditions to ensure this. The total quantity of injected fuel for the pilot and the main injection is substantially constant with respect to the current engine operating conditions, such as engine speed, engine load and efficiency. The quantity of the first injection is preferably selected to be in the range of 0<PI<45% of the total amount of injected fuel.

Due to the demand for dilution, which controls the rate of heat release, only the part load regime of the engine is used for HCCI combustion mode. The auto ignition timing for HCCI operation can be controlled by the pilot fuel injection and/or the captured amount of residuals and/or the absolute manifold pressure. The latter may be controlled by increasing the pressure of the intake air by means of a compressor or turbocharger.

When operating the engine, engine knocking, low combustion stability and a high noise level has to be avoided. Knocking, which is also a source of noise, is detected by measuring the peak pressure and/or pressure variations caused by a too rapid heat release during the expansion phase. Knocking occurs when the peak pressure exceeds an expected maximum pressure, or when a series of rapid pressure variations occur during the expansion phase. Low combustion stability is indicated by high cycle to cycle variations of the pressure during combustion. Typically, an engine operated in HCCI mode may oscillate between a late phased combustion (low cylinder pressure) and a subsequent early phased combustion (high cylinder pressure). When the engine is operating in the HCCI-mode, at least four combinations of sequential combustion cycles are possible. This is illustrated in FIGS. 3A-D.

A more detailed explanation of the cycle-to-cycle variation (COV) and how this may oscillate under different engine operating conditions can be found in the SAE-paper SAE 2002-01-0110, the entirety of which is hereby incorporated into the description by reference. The SAE-paper discusses the cycle-to-cycle variations (COV) during HCCI-operation. The oscillating nature of COV and the effect of exhaust valve closure timing on combustion stability are described.

In all cases shown in FIGS. 2A-D a control unit (not shown) evaluates the signals from sensors that indicate knock and combustion stability. In the figures, a knock signal is deemed to be high if the peak pressure during combustion exceeds an expected pressure level, indicated by a horizontal line in all FIGS. 3A-D. When a COV signal is deemed to be high, this is indicated by a reduced peak pressure during combustion. Due to the cyclic nature of the COV signal, the reduction in peak pressure generally occurs every second combustion cycle. All figures indicate the timing of the piston top dead center (TDC) and the exhaust valve closure (EVC).

Figure 3:
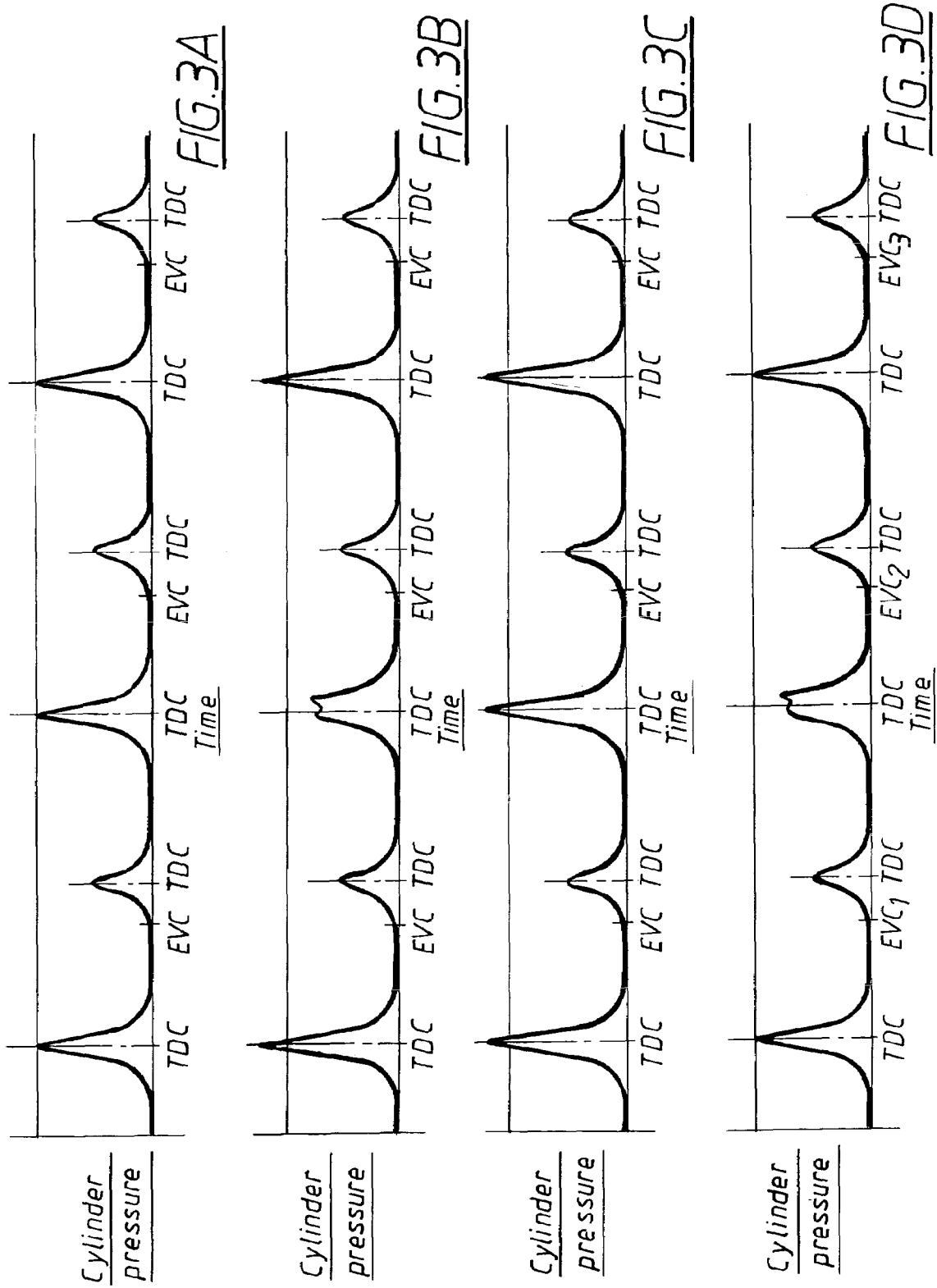
FIG. 3 shows a diagram illustrating the cylinder pressure over time for a number of sequential combustion cycles in HCCI-mode.

FIG. 3A shows the cylinder pressure for a case where the knock signal is low and the oscillating COV signal is low. In this case the noise level can be unacceptable. According to this embodiment, the combustion phasing is retarded by decreasing the amount of fuel injected in the pilot injection, in combination with an increase of the amount for the main fuel injection in order to keep load and lambda constant. Noise level will be reduced with a later phased, or retarded, combustion.

FIG. 3B shows the cylinder pressure for a case where the knock signal is high and the COV signal is high. This indicates high knocking cycles with early phased combustion cycles, alternating with late phased combustion cycles. When both the knock signal and the COV signal is high the amount of fuel injected in the pilot injection is increased, while the amount for the main fuel injection is decreased in order to keep load and lambda constant. The combustion is then phased earlier, or advanced, in the next cycle and engine knock is decreased. For a conventional control strategy, detection of knocking would cause the combustion phasing to be retarded. In this mode of operation such a strategy would cause misfire.

FIG. 3C shows the cylinder pressure for a case where the knock signal is high and the COV signal is low. In this case the amount of fuel injected in the pilot injection is decreased, while the amount for the main fuel injection is increased in order to keep load and lambda constant. The combustion is then phased later in the next cycle and engine knock is decreased. In this context, the term "next cycle" refers to the cycle following immediately after the current cycle.

FIGS. 3B and 3D show the cylinder pressure for a case where the knock signal is low and the COV signal is high. This indicates low knocking cycles with early phased combustion cycles, alternating with late phased combustion cycles. For a conventional control strategy, this would result in an immediate advance of the combustion phasing to avoid problems with stability. However, if this adjustment occurs immediately after a late phased cycle, the result would most likely be engine knocking in the next cycle.

According to the invention, the control unit evaluates the signals from sensors that indicate knock, combustion stability and combustion phasing. The latter is preferably achieved by detecting the location of peak pressure (LPP). When the knock signal is low, the COV signal is high and LPP is early, the amount of fuel injected in the pilot injection is increased, while the amount for the main fuel injection is decreased in order to keep load and lambda constant. This will phase the combustion of the next cycle earlier than it would have been without injection adjustment and combustion stability is increased.

However, if LPP is sensed late, the amount of fuel injected in the pilot injection is increased, while the amount for the main fuel injection is decreased for the cycle after the next cycle. This delay avoids an even earlier and perhaps knocking combustion for the next cycle. If, for some reason, the time taken by the control unit to perform the necessary calculations exceeds the start of the next, immediately following EVC event, then the adjustment of the injections is skipped for two cycles. This is indicated in FIGS. 3B and 3D, where a first event $EVC_1$ is assumed to be missed. The control unit will then skip the cycles including $EVC_1$ and the following event $EVC_2$, to execute the adjusted injection after the start of a third event $EVC_3$.

Figure 4:
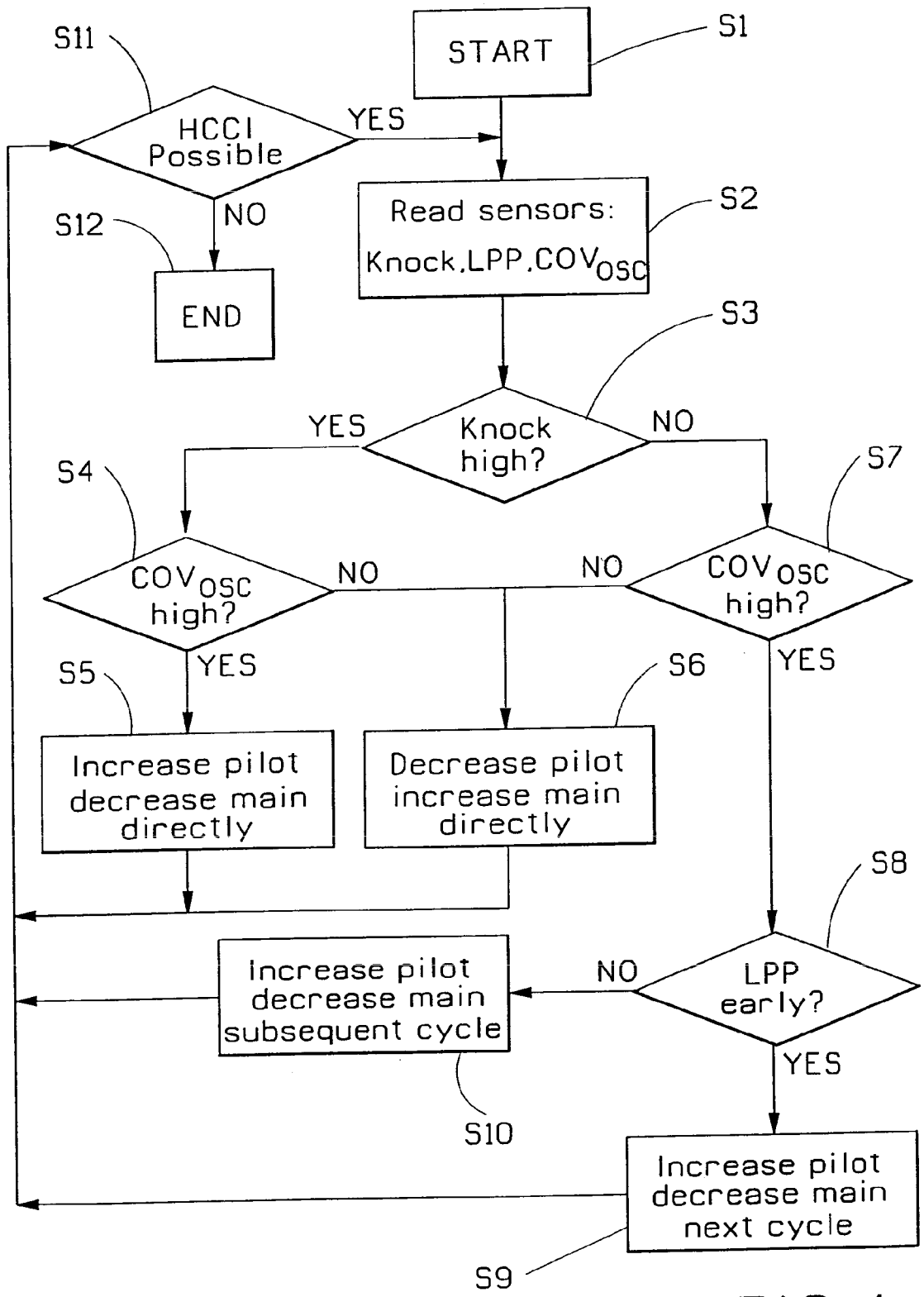
FIG. 4 shows a diagram for a control loop for combustion, stability and knock control in HCCI-mode.

FIG. 4 shows a schematic diagram for a control strategy for managing the combustion control, engine knocking and combustion stability, using variations of the pilot fuel injection which is possible to alter from cycle to cycle. The control strategy involves reading values for pilot and main injection from a map stored in the control unit. Based on these values the control unit performs an evaluation of the output signals from multiple sensors, such as a knocking sensor, a combustion stability sensor and a pressure sensor, and calculates required corrections of the amount of fuel injected in the pilot and main injections accordingly. The corrections are generally very small from cycle to cycle and the magnitude of the incremental steps is controlled by and dependent on the accuracy of the PID regulator used. However, for reasons of clarity, FIG. 4 describes combustion control for steady state condition in order to illustrate the general principle of the invention. In actual use the control unit applies a dynamic regulation dependent on current engine operating conditions.

When the engine is switched from SI-mode to HCCI-mode, the control loop is initiated by the injection control unit. After transmitting a command to start S1 the control loop, the control unit reads the output signals transmitted from a number of sensors S2. In this embodiment the sensors used are a knocking sensor, a combustion stability sensor and a pressure sensor. The control unit will then compare the knock signal with a predetermined limit value S3 to determine whether the signal is high or low. If the knock signal is high the control unit will compare the stability signal, also referred to as COV, with a further predetermined limit value S4. If the COV signal is also high, then the control unit will immediately increase the amount of fuel injected during the pilot injection S5, that is, for the next cycle. As described above, the amount of fuel injected during the main injection will be decreased accordingly. If, on the other hand, the COV signal is low, then the control unit will immediately decrease the amount of fuel injected during the pilot injection S6, that is, for the next cycle.

Should the control unit determine that the knock signal is lower than the predetermined limit value S3, the control unit will compare the COV signal to a predetermined limit value S7, identical to that of step S4. If the COV signal is low, then the control unit will immediately decrease the amount of fuel injected during the pilot injection S6, that is, for the next cycle.

However, if it is determined that the knock signal is low S3 and that the COV signal is high, a further comparison is made using a signal indicating cylinder pressure plotted over time.

The control unit can then determine the location of peak pressure (LPP), that is, when the maximum pressure occurs during combustion. The control unit can then determine if the LPP has occurred early or late S8 with respect to an estimated or desired point in time. If the LPP has occurred early, then the control unit will immediately increase the amount of fuel injected during the pilot injection S9, that is, for the next cycle immediately the current cycle. If, on the other hand, the LPP has occurred late, then the control unit will increase the amount of fuel injected during the pilot injection S10 for the subsequent cycle, that is the cycle following the next cycle. This delay avoids an even earlier and perhaps knocking combustion for the next cycle, as described above, and counteracts possible oscillations caused by cycle-to-cycle variations.

For all the operating conditions described above, the control loop is carried out continuously for each combustion cycle until the control unit determines the HCCI operation is no longer possible S11. The control unit will then end the procedure S12 and switch to SI-mode.

The invention is not limited to the embodiments described above and may be varied freely within the scope of the appended claims.

The invention claimed is:

1. A method for controlling an engine having a variable valve actuator, the method comprising: operating the engine in a first mode where the engine carries out spark ignition combustion of air and fuel; and changing operation to a second mode where the engine carries out homogenous charge compression ignition combustion of air and fuel, where said variable valve actuator unit is adjusted in response to said change to provide a shorter valve timing.

2. The method of claim 1 wherein said variable valve actuator is a variable cam timing actuator.

3. The method of claim 1 wherein said variable valve actuator is a variable valve lift actuator.

4. The method of claim 3 wherein said variable valve actuator is a cam profile switching actuator.

5. The method of claim 1 wherein said variable valve actuator is a cam profile switching actuator.

6. The method of claim 1 wherein spark ignition is utilized at least during a portion of said operation in said second mode.

* * * * *